H. LE B. GRAY.
PHOTOGRAPHIC CAMERA OR HOLDER.
APPLICATION FILED MAY 18, 1914.
1,192,058.
Patented July 25, 1916.
2 SHEETS—SHEET 1.
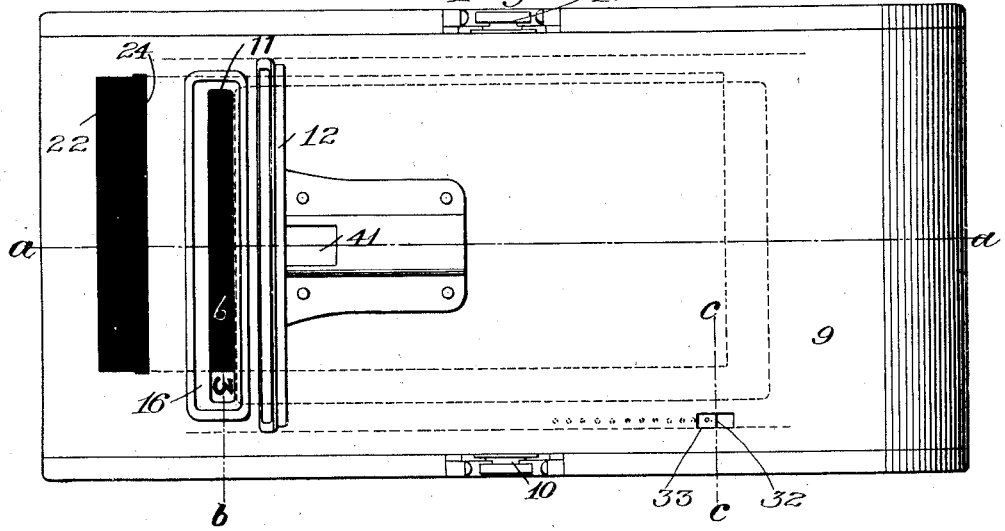
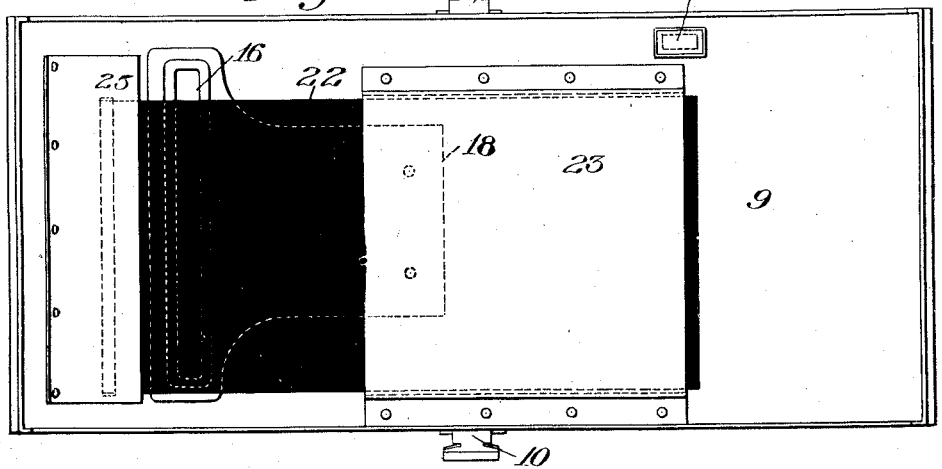
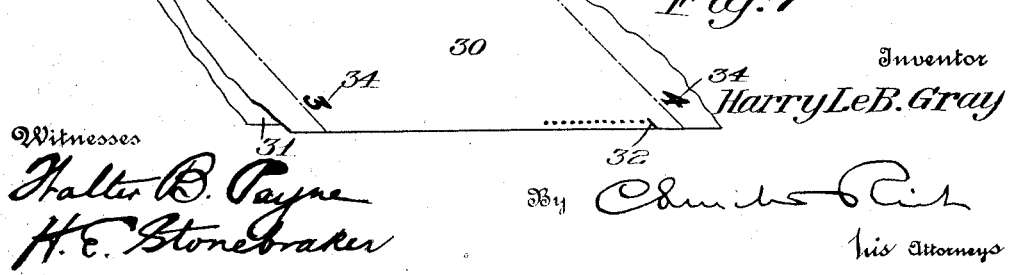
Inventor
Harry Le B. Gray
Witnesses
Walter B. Payne
H. E. Stonebraker
By
his Attorneys H. LE B. GRAY.
PHOTOGRAPHIC CAMERA OR HOLDER.
APPLICATION FILED MAY 18, 1914.
1,192,058.
Patented July 25, 1916.
2 SHEETS—SHEET 2.
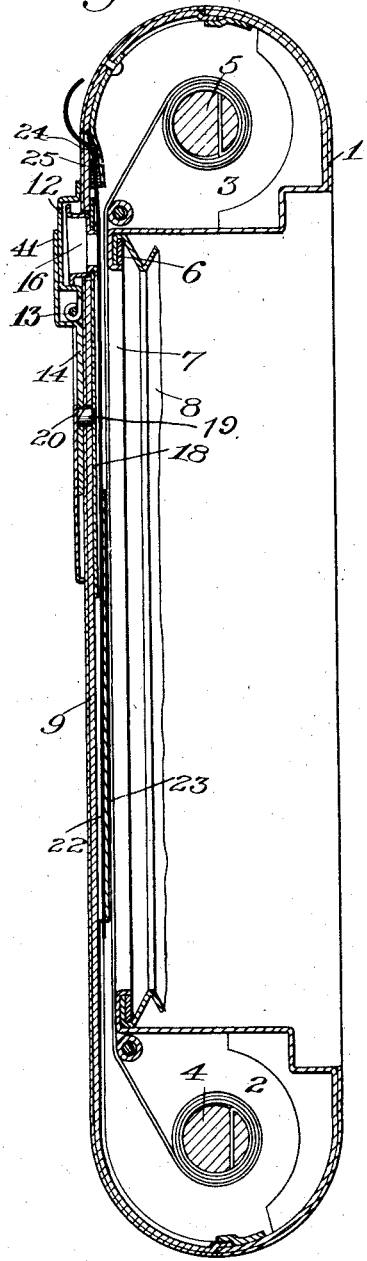
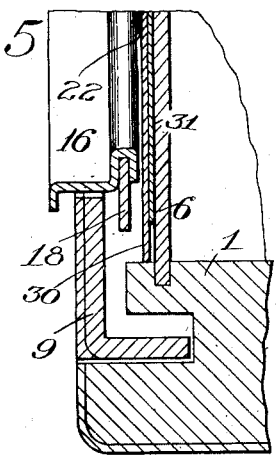
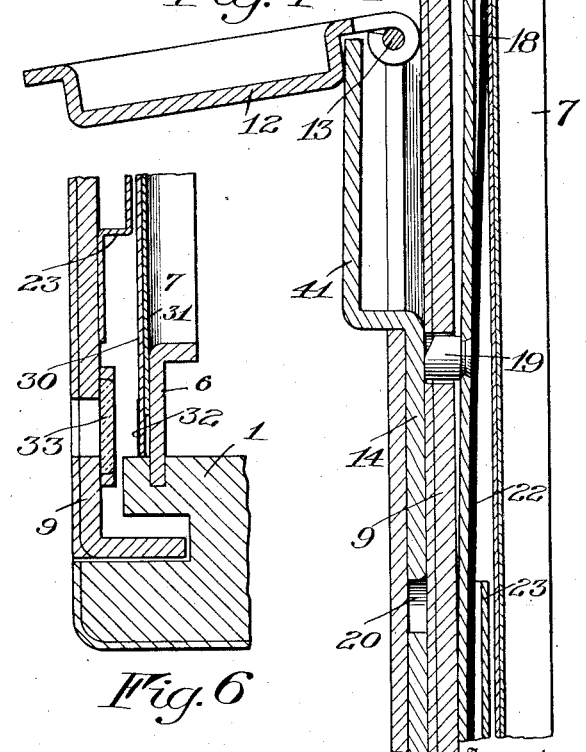
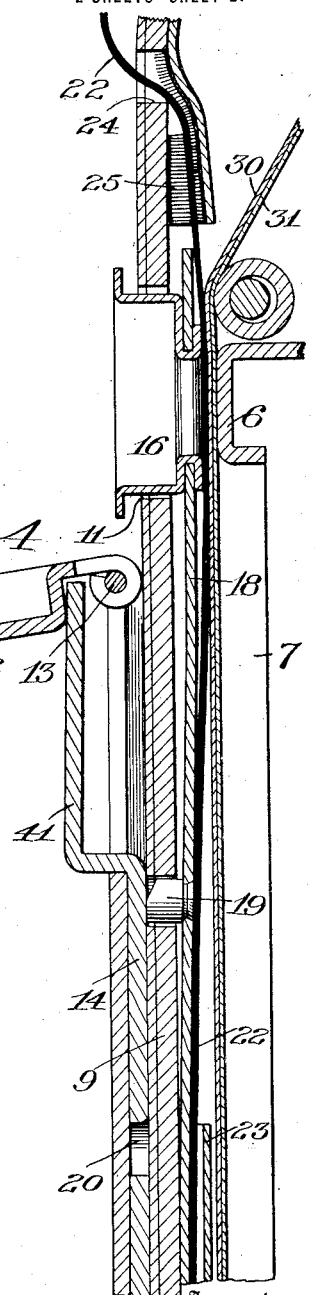
Witnesses
Walter B. Payne
H. E. Stonebraker
Inventor
Harry Le B. Gray
By
his Attorneys

UNITED STATES PATENT OFFICE.

HARRY LE B. GRAY, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC CAMERA OR HOLDER.

1,192,058.

Specification of Letters Patent. Patented July 25, 1916.

Application filed May 18, 1914. Serial No. 839,232.

*To all whom it may concern:*

Be it known that I, HARRY LE B. GRAY, of Rochester, county of Monroe, and State of New York, have invented certain new and useful Improvements in Photographic Cameras or Holders; and I do hereby declare the following to be a full, clear, and exact description of the same, which will enable those skilled in the art to practise my invention.

My invention relates to photographic cameras or holders for sensitized material for use in connection with spools or cartridges of photographic film, whereby the user is enabled to cause designation of memoranda relating to the exposures made or to be made, by light-printing the same on the film so as to become apparent upon development thereof in the usual manner.

The invention is particularly applicable to that class of cameras or holders in which the rear side of the film or sensitized material or that opposite the lens when making exposures, is, under ordinary circumstances, protected by a covering of flexible material which is practically impermeable to the passage of actinic light, but adapted to have portions of the said covering removed, altered or made permeable to actinic light, as by writing thereon with a stylus or pencil, so that upon exposure to the light entering at the rear of the camera or holder, the light will strike through the covering at the portions thus rendered permeable and fog the film on the designated lines or characters.

In addition to the improvements whereby the above results can be accomplished, I provide a film cartridge adapted to be used in connection with the holder embodying means for light-printing upon the film the number or other sequential designation in proximity to the memoranda respecting time, subject, length of exposure or other matter indicated by the writing, forming the subject matter of a divisional application Serial No. 37,372, filed June 30, 1915.

In the accompanying drawings: Figure 1 is a rear elevation of the camera or film holder embodying my improvements and showing the lid or door open through which the designations are made; Fig. 2 is a plan view of the inside of the camera back; Fig. 3 is a longitudinal sectional view taken on the line *a—a* in Fig. 1; Fig. 4 is a similar view of a portion showing the parts enlarged, and the door or covering for the writing aperture open; Fig. 5 is an enlarged sectional view on the line *b—b* of Fig. 1; Fig. 6 is a section on the line *c—c* of Fig. 1; and Fig. 7 is a perspective view of the film and covering therefor employed in connection with this apparatus.

Similar reference numerals throughout the several figures indicate the same parts.

I have shown my invention as applied to a well known form of roll holding camera embodying the casing 1 provided at the ends with chambers 2 and 3 constituting film receptacles and in which the supplying spool 4 and take up spool or roll 5 are respectively located. Arranged between the film chambers or receptacles and near the rear of the casing is the frame 6 having the usual exposure opening 7 therein and to the edges of this frame is attached the rear portion of the bellows 8, if the device as a whole is to constitute a camera.

The rear of the casing and the film chambers are adapted to be closed or covered by a removable cover, wall or back 9 having its edges arranged to coöperate with the casing to produce a light tight joint and secured in position by the usual catches or fastening devices 10. The back 9 is provided with an opening 11 extending through it and arranged over one of the ends of the frame 6 preferably near the winding spool or roll 5 which opening is adapted to be closed by a lid or cover 12, hinged at 13 to the casing and adapted to be swung up into the position shown in Fig. 4, and when closed, said cover is secured by suitable means, such as an arm 41 on a sliding plate 14 arranged to operate in suitable guides on the back. The opening 11 extends transversely of the holder and of the direction in which the film is wound, and is slightly less in length than the width of the holder. 16 indicates a sheet metal thimble or frame of approximately the size and shape of opening 11 fitting within the same and provided at its outer side with an outwardly extending flange. This thimble or frame is attached to and supported upon the free end of a resilient clamping plate 18 arranged within the camera back and so connected therewith that when the cover 12 is open, the clamping plate will move inwardly, clamping the film and a covering sheet at the edges of the aperture upon the frame 6, as shown particularly in Fig. 4, and not only holding the parts firmly, but preventing the passage of light excepting through the opening of the plate, and when the cover is closed it will be moved outwardly away from the film. The movement of the clamp toward the film is preferably caused automatically when the cover 12 is opened, and in the present embodiment, the plate 14 carrying the holding arm 41 is adapted to engage a stud or projection 19 attached to the plate 18 and press the clamp toward the film when the door is open, but when the door is closed and the arm 41 is moved over the cover to secure it, the stud 19 will enter a recess 20 in the plate 14 and allow the clamp to move outwardly, thus freeing the film so that it may be wound forward for another exposure, as shown in Fig. 3.

22 indicates a flexible flat covering sheet supported in a suitable guide or pocket 23 arranged on the under side of the back 9 and on one side of the opening therein, its free end passing outside of the camera and beyond the opening 11 and through a suitable slot or opening 24, which is rendered light tight by suitable light excluding means, such as plush or velvet strips 25, preventing the passage of light into the camera or holder while the covering strip is being withdrawn or after it is removed. This covering strip 22 is composed of material which is practically impermeable to actinic rays of light of sufficient intensity to injuriously affect the film, but which is adapted to be made permeable by writing upon it with a suitable stylus and may, and preferably does, consist of a sheet of carbon paper similar to manifolding paper, the coating or covering of which may be displaced locally by the point of the stylus so as to permit the passage of light. The coating may be located on the outer or inner side and in either event, it may be removed or pushed aside by a writing stylus to permit the passage of light along designated lines. It will, therefore, be seen that when the cover 12 is open the operator may, by writing through the slot 11 upon the carbon paper or similar covering, remove or affect the coating in such a manner that light entering through the aperture may affect the film or sensitized material underneath it, the frame 6 serving as a back or support on which the film and covering are held. When the lid or cover 12 is removed in order to accomplish this writing, the film and covering 22 are held flat to prevent relative movement of the parts and also to hold the covering and film in close contact and prevent the passage of light to the film otherwise than on the lines traced by the stylus, and when the cover is closed, the film and covering 22 are released and by drawing on the end of the latter which is extended to the exterior of the casing, a new section may be drawn forward beneath the opening and the portion containing previous designations torn off. By this means, the user may cause memoranda to be light-printed upon the film at the edge of the exposure opening 7 so that when the film is developed the designations will appear in black lines on the negatives.

In order that the numerals or other sequential designations of the different exposures of the film may also be light-printed upon the film itself and so that the operator may determine the proper feeding of the film in the camera, I provide a film cartridge of special construction adapted to be used in connection with the mechanism described. This cartridge embodies a strip of paper or similar material longer than the film and corresponding in size and shape to the ordinary black paper backing on the film cartridge in general use, but instead of being opaque, said paper is more or less translucent and preferably of an orange red color, of such density that while a single thickness will not prevent the passage of actinic light, several convolutions thereof will effectually exclude light and form an opaque covering for the film, thus preventing it from being light struck when the film and paper are wound upon one of the spools. The paper backing is a trifle wider than the strip of sensitized transparent film indicated by 31, which is or may be attached at one or both ends to the paper in the usual manner and said paper is provided at its extreme edge with a designating mark 32, adapted to be visible through the usual aperture 33 covered by the usual ruby window arranged in the camera back at one edge of the exposing aperture 7, as shown in Figs. 1 and 2. The paper covering 30 is provided with sequential designating marks 34 preferably printed thereon in black or opaque ink at a distance from the mark 32 equal to the length of the exposure for which the camera or holder is adapted, that is to say, substantially the length of the exposing aperture itself. This designation 34 will be visible through the opening 11 in the camera back when the lid or cover 12 is removed, as shown in Fig. 1 and the flexible covering or carbon paper 22 is slightly narrower than the film, so that when said cover is open, as shown in Fig. 1, light entering the camera will pass through the cover paper 30 and print the designation 34 upon the film, the ink of said designation preventing the passing of light, so that the number of the exposure will appear in the negative in this instance as a transparent figure surrounded by a blackened mortise or field.

In using the holder or camera in connection with the cartridge described, the operator winds the film forward until one of the designating marks 32 appears opposite the aperture covered by the window 33. He then makes the exposure in the usual way, then moves the lock 41 from the cover 12, clamping the film and the covering 22 upon the frame 6, and with a pencil or stylus writes upon the covering 22 any data relating to the exposure, thus rendering it light permeable on the designated lines and allows light either from the sun or an artificial source to enter the slot and affect the film beneath, not only through the lines traced by the stylus in the covering but also through the sequential designation 34 marked on the covering paper at the side of the covering. He then closes the cover 12 and secures it by the lock 41, thereby releasing the film and carbon paper and for the next exposure winds forward the film and covering 30 in the usual manner until another mark 32 appears at the opening covered by the ruby glass or window 33. If he desires another designation than the last preceding one to mark other exposures, he draws forward the covering 22 to bring a fresh portion thereof beneath the opening and either tears off the portion extending beyond the slot 24 or retains it as memoranda of the exposures made by him.

Inasmuch as the sequential designations printed on the film, in this embodiment of my invention are practically in line with the exposures, it is essential that the door or cover 12 be closed during the feeding of the film and this is secured by the employment of the coöperation of the door securing means and the film clamp described.

It will be understood that although I have described my invention as applied to a camera, it is equally applicable to a roll holder adapted to be separately applied to a camera of any desired description.

While it is true that the portion of the film which passes beneath the window or aperture 33 will be fogged or exposed as the film is drawn forward in the camera, this exposed portion is beside the margin of the exposure aperture and will, therefore, not appear in the finished negative but is a part of the film which is ordinarily wasted.

I claim as my invention:

1. In a holder for sensitized photographic material, the combination with a casing having an exposing aperture at the front, of a back for said holder having an opening extending through it, and a guide located on one side of said opening, extending parallel to said back and adapted to hold a flat sheet, said back being provided with a light tight passage extending therethrough arranged on the side of the opening opposite the pocket.

2. In a holder for sensitized photographic material, the combination with a casing having an exposing aperture at the front, of a back for said holder having an opening extending through it, and a pocket located on one side of said opening, said back being provided with a light tight passage extending therethrough located on the opposite side of said opening, and a sheet of material located in the pocket and extending across the opening and having its free end extending through the light tight opening, said sheet being normally impermeable by actinic light but capable of being rendered light permeable by writing thereon with a stylus.

3. In a holder for sensitized photographic material, the combination with a casing, of a removable covering member extending over the sensitized material in the casing having an opening therein, and a pocket in the covering member on one side of the opening adapted to receive a flat sheet extending lengthwise of the holder, there being a light tight passage on the opposite side of said opening leading to the exterior of the holder.

4. In a holder for sensitized photographic material, the combination with a casing having an exposing aperture at the front, of a back for said holder having an opening extending through it, a pocket located on one side of said opening, and a movable sheet of flexible material located in the pocket and extending beneath a portion only of the opening in the back, said sheet being normally impermeable by actinic light but capable of being rendered light permeable by writing thereon with a stylus.

5. In a holder for sensitized photographic film, the combination with a casing having an exposing aperture at the front and film receptacles at the ends, of a removable back extending over said receptacles and aperture and having an opening extending through it near one end of the exposing aperture, there being a sight opening near the opposite end of said aperture, said back also having a pocket on one side of said first mentioned opening extending parallel with the back and adapted to contain a flat sheet of material normally impermeable to actinic light but capable of being rendered permeable by writing thereon.

6. In a holder for photographic film, a casing and film supply and winding devices therein, said casing having an opening through a wall thereof extending transversely of the film, a movable closure for said opening, and a sheet of material arranged beneath a portion of said opening, said sheet being normally impermeable by actinic light but capable of being rendered permeable by writing thereon with a stylus in combination with a sheet of translucent material movable with the film beneath the opening and having sequential designating markings thereon adapted to be light printed upon the film.

7. In a holder for photographic film, a casing and film supply and winding devices therein, said casing having an opening through a wall thereof, a movable cover for said opening, a sheet of material normally impermeable to actinic light but capable of being rendered locally permeable to light by writing thereon arranged beneath said opening, said sheet being narrower than the opening, and a clamp engaging the sheet and connections between the clamp and cover for operating the former when the cover is removed.

HARRY LE B. GRAY.

Witnesses:
 CHARLES W. WORKERS,
 CHARLES C. COLFAX.